United States Patent
Liniger et al.

(10) Patent No.: US 10,673,361 B2
(45) Date of Patent: Jun. 2, 2020

(54) ACTUATOR WITH INTEGRATED POSITION SENSOR AND PLAY COMPENSATION

(71) Applicant: SOCIETE INDUSTRIELLE DE SONCEBOZ SA, Sonceboz (CH)

(72) Inventors: Martin Liniger, Porrentruy (CH); Markus Flückiger, Bienne (CH); Jan Persson, Magglingen (CH)

(73) Assignee: Societe Industrielle De Sonceboz SA, Sonceboz (CH)

( * ) Notice: Subject to any disclaimer, the term of this patent is extended or adjusted under 35 U.S.C. 154(b) by 94 days.

(21) Appl. No.: 15/746,890

(22) PCT Filed: Jul. 18, 2016

(86) PCT No.: PCT/IB2016/054269
§ 371 (c)(1),
(2) Date: Jan. 23, 2018

(87) PCT Pub. No.: WO2017/017557
PCT Pub. Date: Feb. 2, 2017

(65) Prior Publication Data
US 2019/0140568 A1    May 9, 2019

(30) Foreign Application Priority Data
Jul. 24, 2015    (EP) .................................. 15178352

(51) Int. Cl.
*B41J 19/20*    (2006.01)
*H02P 8/08*    (2006.01)
*H02P 6/182*    (2016.01)
*H02P 6/16*    (2016.01)
*H02P 8/42*    (2006.01)
*H02P 8/12*    (2006.01)

(52) U.S. Cl.
CPC .................. *H02P 8/08* (2013.01); *H02P 6/16* (2013.01); *H02P 6/182* (2013.01); *H02P 8/12* (2013.01); *H02P 8/42* (2013.01)

(58) Field of Classification Search
CPC .... H02P 6/16; H02P 6/182; H02P 8/08; H02P 8/12; H02P 8/42
See application file for complete search history.

(56) References Cited

U.S. PATENT DOCUMENTS

| 5,874,821 A | 2/1999 | Monleone |
| 7,591,448 B2 | 9/2009 | Martin |

(Continued)

FOREIGN PATENT DOCUMENTS

| JP | 2012060705 | 3/2012 |
| WO | WO 2011/054074 | 5/2011 |
| WO | WO 2014/140489 | 9/2014 |

OTHER PUBLICATIONS

International Search Report and Written Opinion of the International Searching Authority, dated Jan. 3, 2017, for related International patent application No. PCT/IB2016/054269; 21 pages.

*Primary Examiner* — Muhammad S Islam
(74) *Attorney, Agent, or Firm* — Faegre Drinker Biddle & Reath LLP (57) ABSTRACT

Methods of compensating for play and for initializing a position encoder in an actuation system (2) including an actuated system (8) comprising an elastic element, and an actuator (4) with a stepper motor (12) having at least one electrical phase.

26 Claims, 7 Drawing Sheets (56) References Cited

U.S. PATENT DOCUMENTS

| | | |
|---|---|---|
| 2003/0222617 A1 | 12/2003 | Nakai |
| 2008/0100249 A1 | 5/2008 | Coutu |
| 2010/0289444 A1 | 11/2010 | Niwa |
| 2011/0298412 A1* | 12/2011 | Bilat .................. H02P 8/32 |
| | | 318/696 |
| 2014/0035496 A1 | 2/2014 | Mizuo |

* cited by examiner

| QEP_A | 0 (false) | 1 (true) | 1 (true) | 0 (false) | 0 (false) | |
|---|---|---|---|---|---|---|
| QEP_B | 0 (false) | 0 (false) | 1 (true) | 1 (true) | 0 (false) | |
| QepWord | 01 | 00 | 10 | 11 | 01 | Before update (no dir. change) |
| QepWord | 00 | 10 | 11 | 01 | 00 | After update |

*Discontinuous line: Electrical angle*
*Continuous line: Rotor angle*

ACTUATOR WITH INTEGRATED POSITION SENSOR AND PLAY COMPENSATION

This application claims priority to PCT Application Number PCT/IB2016/054269 filed Jul. 18, 2016, which in turn claims priority from European Patent Application Number EP 15178352.9 filed Jul. 24, 2015, the subject matter of which are incorporated herein by reference.

The present invention relates to an actuation system comprising an electrical motor coupled to an actuated system containing a mechanism generating an elastic restoring force. Such actuated systems may be found in various applications, one of these being hydraulic drive systems where the actuation system controls a hydraulic valve. For instance the stepper motor may be coupled to a valve spool of a hydraulic servo valve whereby the spool position controls the hydraulic oil flow.

Hydraulic drive systems are used in many mechanical load applications, for example in construction equipment, farming equipment, fork lifts, cranes and other hydraulically driven work systems. Hydraulic pistons driving an associated mechanical organ are controlled by valves controlling the flow of hydraulic fluid through a pump line and a return line, in order to fill or to empty the hydraulic piston. The degree of opening and closing of the pump line, respectively return line control valves, determines the rate of displacement and position of the associated mechanical load member. It is therefore important to ensure accuracy in the opening and closing of the control valves and to reduce sensitivity of the control valve opening to pressure in the hydraulic system. The use of a stepping motor to actuate a valve rod is advantageous in view of the high rigidity it confers to the hydraulic valve control system as well as enabling high precision in the opening and closing of the valves through control of the stepping motor, such a system being described in U.S. Pat. No. 7,591,448. To fit into a valve stack environment the width of the actuator may be limited thus requiring a configuration that makes optimal use of the available width.

High accuracy may be achieved if the coupling between the stepper motor and the spool has minimal mechanical play and maximal stiffness. This however requires tight manufacturing and assembly tolerances, and manufacturing costs are increased accordingly. Moreover problems arise due to temperature effects and aging and wear of components which reduce the positioning accuracy and repeatability of the system during its life time. To achieve a desired position accuracy certain conventional systems thus compensate for mechanical play, which in some systems first requires measuring the mechanical play.

The mechanical play may be measured during a start up phase of the actuator or at specified or pre-determined intervals or events. Many existing mechanical play measurement methods are complex and/or lack precision or reliability. Complexity may negatively affect the cost of the control system and reduce the speed of measurement. Faster initialization and control of actuation systems improve performance and may be important for many actuated systems. An illustrative example of one of many actuated systems requiring fast initialization and control is for instance a rear-hitch application in tractors where start-up time should be as small as possible.

Positioning accuracy however also depends on obtaining an accurate initialization of a position encoder of the system under load and harsh conditions such as vibrations.

An objective of the invention is therefore to provide a reliable and compact actuation system that enables accurate positioning of an actuated element.

It is advantageous to provide an actuation system that is fast and responsive.

It is advantageous to provide an actuation system that is economical to produce and assemble.

It is advantageous, for certain applications, to provide an actuator that has a low height.

Objects of the invention have been achieved by providing an actuation system according to the independent claims. Dependent claims set forth advantageous embodiments.

According to a first aspect of the invention, disclosed herein is a method of compensating for play in an actuation system including an actuated system comprising an elastic element, and an actuator with a stepper motor having at least one electrical phase, the method comprising:

supplying by means of a current controller said at least one electrical phase with a first limited phase current configured to drive the rotor of the stepper motor in a first direction (X+), said limited phase current having an amplitude inferior to an operational phase current needed to drive the rotor in normal load operation for actuation of the actuated system in said first direction, detecting a loss of steps of the stepper motor in said first direction and determining therefrom a first end of mechanical play position, driving with a second limited phase current the rotor of the stepper motor in a second direction (X−) opposite to the first direction, said second limited phase current having an amplitude inferior to an operational phase current needed to drive the rotor in normal load operation for actuation of the actuated system in the second direction, detecting a loss of steps of the stepper motor in said second direction and determining therefrom a second end of mechanical play position, compensating for mechanical play in the actuation system based on the first and second ends of mechanical play positions.

According to a second aspect of the invention, disclosed herein is a method of initializing a position sensor of an actuation system including an actuated system and an actuator with a stepper motor having at least one electrical phase, the method comprising:

supplying a current to said at least one electrical phase configured to accelerate a rotor of the motor during an acceleration phase, switching off the supply current in said at least one electrical phase, measuring a back EMF voltage in said at least one electrical phase with the supply current switched off and determining a mechanical position of the rotor when the back EMF voltage measurement reaches a pre-defined value, aligning a mechanical position of the rotor with an electrical angle of said at least one electrical phase at said position when the back EMF voltage reaches said pre-defined value.

In an advantageous embodiment, said detecting a loss of steps is performed by means of a rotor position sensor or by means of a software stall detection algorithm based on current and voltage measurement of an electrical phase of the motor.

In an advantageous embodiment, the rotor position sensor comprises a rotary encoder and the motion direction change is detected by quadrature encoder pulse (QEP) signals generated by the rotary encoder.

In an advantageous embodiment, on the basis of the QEP signals a direction change interrupt service routine is triggered.

In an advantageous embodiment, the current controller drives the electrical phase in open loop regulation.

According to a variant, the stepper motor may be replaced by other types of permanent magnet synchronous (PMS) motors, in particular a BLDC (brushless direct current) motor, that is driven in open loop stepper mode during the method of compensating for play. After the detection of play and compensation therefor, the BLDC motor may then be driven in closed loop mode as is per se well known for PMS BLDC motors.

In this variant, a method of compensating for play in an actuation system includes an actuated system comprising an elastic element, and an actuator with a PSM BLDC motor having at least one electrical phase, the method comprising:

supplying by means of a current controller said at least one electrical phase with a first limited phase current configured to drive in open loop stepper mode the rotor of the BLDC motor in a first direction (X+), said limited phase current having an amplitude inferior to an operational phase current needed to drive the rotor in normal load operation for actuation of the actuated system in said first direction, detecting a loss of steps of the BLDC motor in said first direction and determining therefrom a first end of mechanical play position, driving in open loop stepper mode with a second limited phase current the rotor of the stepper motor in a second direction (X−) opposite to the first direction, said second limited phase current having an amplitude inferior to an operational phase current needed to drive the rotor in normal load operation for actuation of the actuated system in the second direction, detecting a loss of steps of the BLDC motor in said second direction and determining therefrom a second end of mechanical play position, compensating for mechanical play in the actuation system based on the first and second ends of mechanical play positions.

In an advantageous embodiment, the loss of steps is detected by sensing a motion direction change on the rotor displacement.

In an advantageous embodiment, the first and second limited phase currents may have amplitudes inferior to the phase currents required to generate sufficient torque to overcome a spring force of the elastic element of the actuated system necessary to control the actuated system.

In an advantageous embodiment, the actuated system may be a hydraulic valve system comprising one or more valve spools, and the torque on the rotor produced by the first and second limited phase currents either:

does not move a valve spool by not exceeding a spring preload force of the elastic element biasing the valve spool, or does not move the valve spool sufficiently to change a valve setting by not exceeding a spring force of the elastic element necessary to move the valve spool enough to the change the valve setting.

In an advantageous embodiment, said pre-defined value is null.

In an advantageous embodiment, an average of the phase voltage on at least one of the phases (phase A) is determined by computing an average of a plurality of measurements of the phase voltage, said average value allowing to determine said pre-defined value of the back EMF voltage.

In an advantageous embodiment, after setting an initial electrical angle, an initial oscillation movement of the rotor may be performed.

In an advantageous embodiment, during said acceleration phase of the rotor, the electrical angle may be set one step further than the computed rotor mechanical position in order to produce maximum torque.

In an advantageous embodiment, the acceleration phase lasts until the computed rotor mechanical position reaches a predefined threshold angle.

In an advantageous embodiment, the phase current may be switched off at the end of the acceleration phase and the phase voltage may be measured after a predetermined waiting time to ensure that a negative voltage peak due to a rapid change in current (di/dt) does not produce a false measurement.

In an advantageous embodiment, when the phase voltage corresponds to the computed average of the phase voltage then the position of the rotor is determined and the encoder position is initialized.

In an advantageous embodiment, after initialization of the encoder position, the rotor is decelerated to keep the initialization procedure as short as possible.

Further disclosed herein is an actuator comprising a stepper motor having at least one electrical phase, a controller, a rotor position sensor, and a motion transmission system configured to be coupled to an actuated system. The controller is configured to supply said at least one electrical phase with a first limited phase current configured to drive the rotor of the stepper motor in a first direction, said limited phase current having an amplitude inferior to an operational phase current needed to drive the rotor in normal load operation for actuation of the actuated system in said first direction, and the rotor position sensor is configured to detect a loss of steps of the stepper motor in said first direction and the controller is configured to determine therefrom a first end of mechanical play position. The current controller is configured to supply said at least one electrical phase with a second limited phase current to drive the rotor of the stepper motor in a second direction opposite to the first direction, said second limited phase current having an amplitude inferior to an operational phase current needed to drive the rotor in normal load operation for actuation of the actuated system in the second direction, said rotor position sensor configured to detect a loss of steps of the stepper motor in said second direction and the controller is configured to determine therefrom a second end of mechanical play position. The actuator is configured to compensate for mechanical play in the actuation system based on the first and second ends of mechanical play positions.

Also disclosed herein is an actuator comprising a stepper motor having at least one electrical phase, a controller, a rotor position sensor, a back EMF voltage sensor, a current sensor, and a motion transmission system configured to be coupled to an actuated system. The controller is configured to supply a current to said at least one electrical phase to accelerate a rotor of the stepper motor during an acceleration phase and subsequently switch off the supply current in said at least one electrical phase. The back EMF voltage sensor is configured to measure a back EMF voltage in said at least one electrical phase with the supply current switched off and the rotor position sensor is configured to determine therefrom a mechanical position of the rotor when the back EMF voltage measurement reaches a pre-defined value. The controller is configured to control the stepper motor to align a mechanical position of the rotor with an electrical angle of said at least one electrical phase at said position when the back EMF voltage reaches a pre-defined value.

As mentioned above, according to a variant, the stepper motor may be replaced by other types of permanent magnet synchronous (PMS) motors, in particular a BLDC (brushless direct current) motor, comprising a controller configured to drive the motor in an open loop stepper mode during the method of compensating for play. After the detection of play and compensation therefor, the controller is configured to drive the BLDC motor in closed loop mode as is per se well known for PMS BLDC motors.

According to an embodiment, the rotor position sensor may comprise Hall effect sensors integrated in the motor, for instance three Hall effect sensors.

The actuator may be configured to implement any of the method steps described above.

Due to a software based mechanical play compensation method, the accuracy is maintained throughout its lifespan, despite the wear of its components, and thermal effects. Furthermore, moving this complexity to software allows for relaxing tolerances on the mechanical side which yields a reduction of manufacturing costs.

An advantage of the actuation system according to the present invention is the robustness to parameter variations and therefore increased reliability in series produced products. Combining an integrated position sensor to the control algorithm of the invention that, contrary to conventional systems, is not predicated on induced voltage measurements is particularly advantageous in this respect. Moreover, instead of a sequence of many measurements, in the invention it is possible to perform a single measurement in both directions of the actuator (back and forward) to obtain a mechanical play value. This results in faster detection depending on the value of the mechanical play compared to conventional mechanical play detection systems.

Further objects and advantageous features of the invention will be apparent from the claims, from the detailed description, and annexed drawings, in which:

Figure 1:
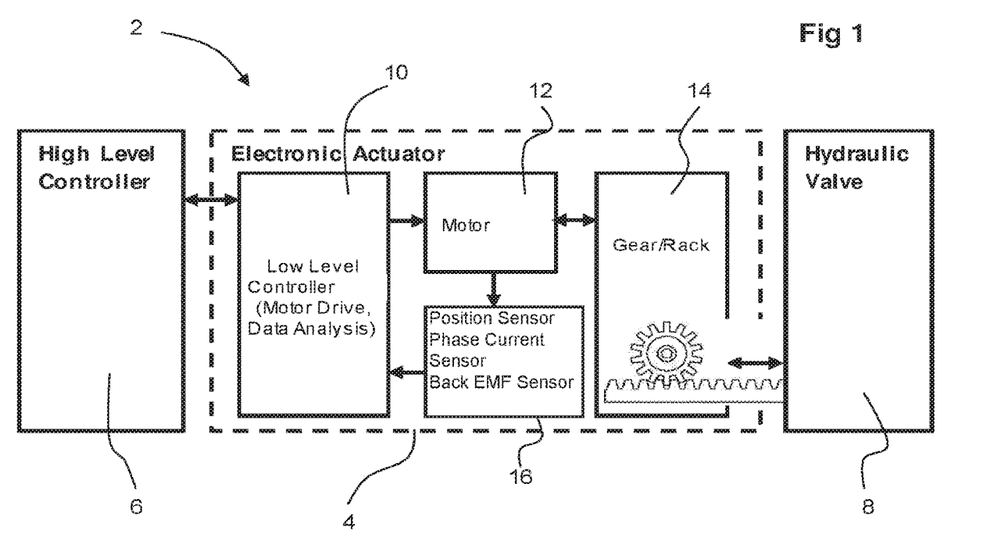
FIG. 1 is a simplified block schema of an actuation system according to an embodiment.
Figure 2:
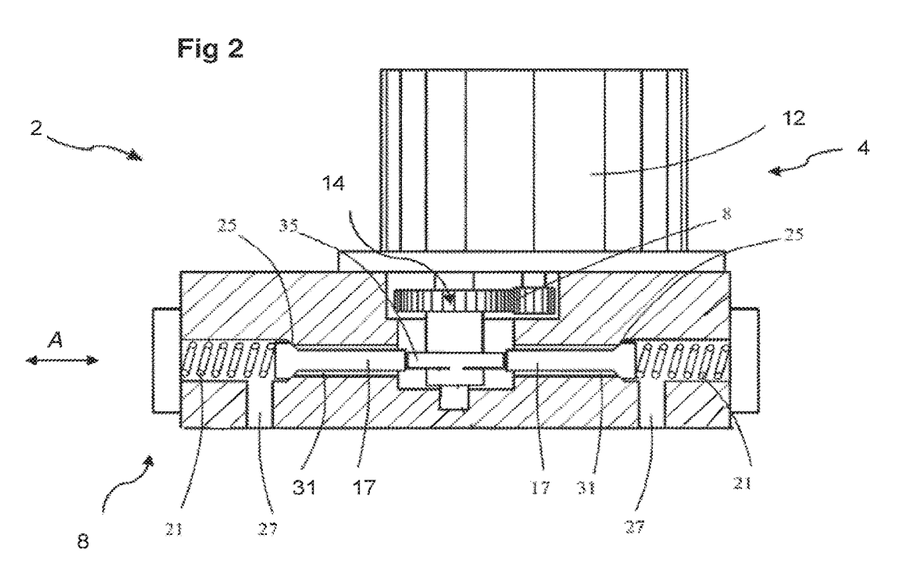
FIG. 2 is a simplified partial cross-sectional view of an example of an actuation system comprising a hydraulic valve control.

Referring to the figures, starting with FIGS. 1 and 2, an actuation system 2 according to an embodiment of the invention comprises an electronic actuator 4 that may be connected to a high level controller 6 and coupled to an actuated system 8 such as a hydraulic valve system. The actuator may exchange information via a communication bus with the high level controller 6, and drives the position of an organ, such as a valve spool or seat valve, of the actuated system.

The actuated system comprises an elastic restoring mechanism that elastically biases an organ of the actuated system towards a certain pre-set position, for instance a valve closed position.

The actuator 4 comprises a low lever controller 10, a stepper motor 12, and a motion transmission system 14, and sensors for measuring phase current, back EMF and rotor position.

The low level controller 10 is configured to drive the stepper motor and may be provided with current, voltage and position measurement capability and data analysis for on board diagnostics.

The stepper motor 12 comprises a rotor and a stator with at least one electrical phase, whereby the motor may further include an integrated position sensor configured to determine the angular position or displacement of the rotor relative to the stator.

The motion transmission system 14 is configured to be attached to the actuated system 8 comprising an elastic element able to generate an elastic restoring force, whereby the actuated system may for instance comprise a valve spool and the motion transmission 14 may for instance comprise a rotary cam mechanism or a gear/rack mechanism coupled to the elastic biased organ of the actuated system.

In the example illustrated in FIG. 2, the stepper motor 12 a hydraulic valve comprises two valve portions, each valve portion comprising a piston or spool element 17, an elastic element 21, a piston seat 25, an input chamber 27, and an output chamber 31. The motion transmission system 14 comprises a rotatable cam element 35 coupled to a reduction gear mechanism coupled to the rotor of the stepper motor 12. The cam element 35 engages the spool elements 17 to displace them in a linear direction A, thereby opening or closing the space between the valve seat and head of the spool element as a function of the desired hydraulic command. In this example, the elastic restoring force provided by the actuated system on the rotor of the stepping motor 12 is effected by the elastic elements 21 biasing the valve elements 17 towards the valve closed position. Within the scope of the invention other elastic biasing or restoring arrangements may however be provided to exercise an elastic force on the rotor of the motor.

According to one aspect of the invention, the actuator is configured to determine the end of mechanical play positions in a forward, respectively a reverse direction of movement. Once the end of mechanical play position in the forward direction of movement and the end of mechanical play position in the reverse direction of movement are known, the actuator may compensate for the mechanical play in the actuator and actuated system coupled thereto in order to ensure accurate displacement and positioning of the actuated system, for instance a valve spool of the actuated system. The determination of mechanical play may be performed at each start up of the actuator, and/or at predetermined and/or regular intervals during use of the actuator, and/or at any other event selected by an operator or programmed in the actuator or the high level controller 6.

Figure 3:
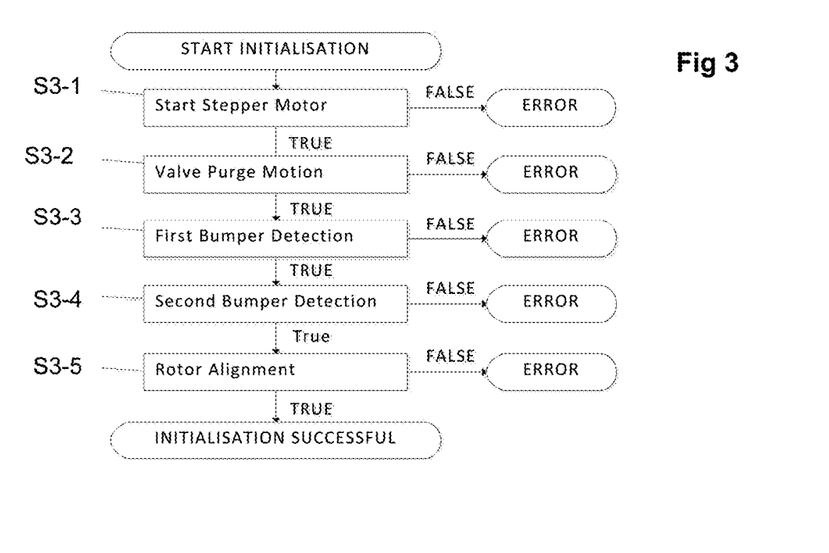
FIG. 3 is a simplified flow diagram of an end of play position detection process according to an embodiment of the invention.
Figure 4:
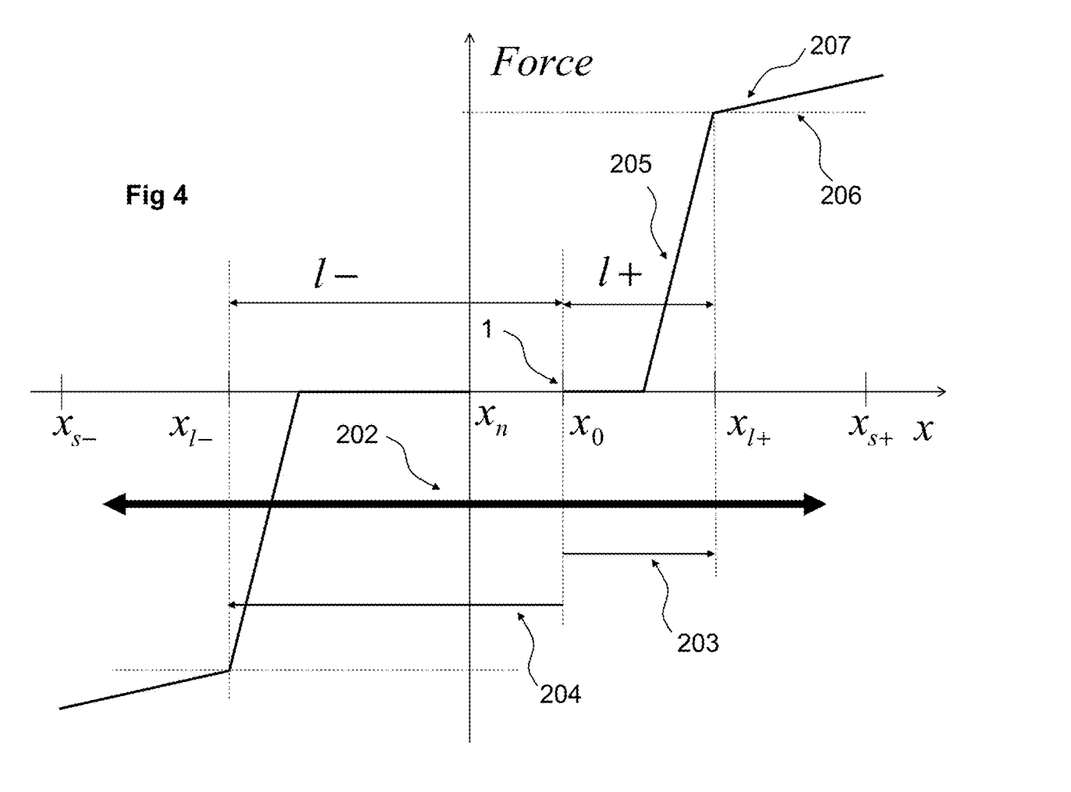
FIG. 4 is a simplified graph of Force vs Displacement exerted on the rotor of a motor of an actuation system.

Referring to FIGS. 3 and 4, in an embodiment with a hydraulic valve system, the mechanical play detection may comprise:
- S3-1 Starting the stepper motor: the stepper motor current is set and the rotor will stabilize in an electrically stable position $X_0$ which is defined by a step of the stepping motor.
- S3-2 Effecting a valve purge motion: forward and reverse motion 202 of the spool(s) 17 with high phase current to avoid eventual sticking of valve joints or grease, but without generating oil flow.
- S3-3 First end of mechanical play detection (bumper detection): $X_{l+}$ bumper detection during forward movement 203
- S3-4 Second bumper detection: $X_{l-}$ bumper detection during reverse movement 204
- S3-5 Rotor alignment and neutral position $X_n$ computation: $X_n = [X_{l-}] + ([l+] + [l-])/2$ According to an embodiment, the end of mechanical play detection method comprises driving the rotor of the stepper motor 12 in a first direction X+ as illustrated in FIG. 4 using an open loop position field oriented current control with limited phase currents. The limited phase currents have amplitudes inferior to the operational phase currents needed to drive the rotor in normal load operation for actuation of the actuated system 8. In particular, the limited phase currents have amplitudes inferior to the phase currents required to generate sufficient torque to overcome the spring force of the elastic element of the actuated system 8 necessary to control the actuated system 8. During the end of mechanical play detection procedure, the actuator thus does not produce sufficient force to actuate the actuated system 8. In a hydraulic valve application, this means for instance that the torque produced by the stepper motor supplied with the limited phase currents either:
- does not move the valve spool by not exceeding a spring preload force 206 of the elastic element biasing the valve spool, or
- does not move the valve spool sufficiently to change the valve setting (closing or opening the valve) by not exceeding a spring force of the elastic element necessary to move the valve spool enough to the change the valve setting. In the latter situation, some valve spools are configured to have a certain dead displacement in which the valve remains closed (or inversely open, depending on the control function).

Figure 5:
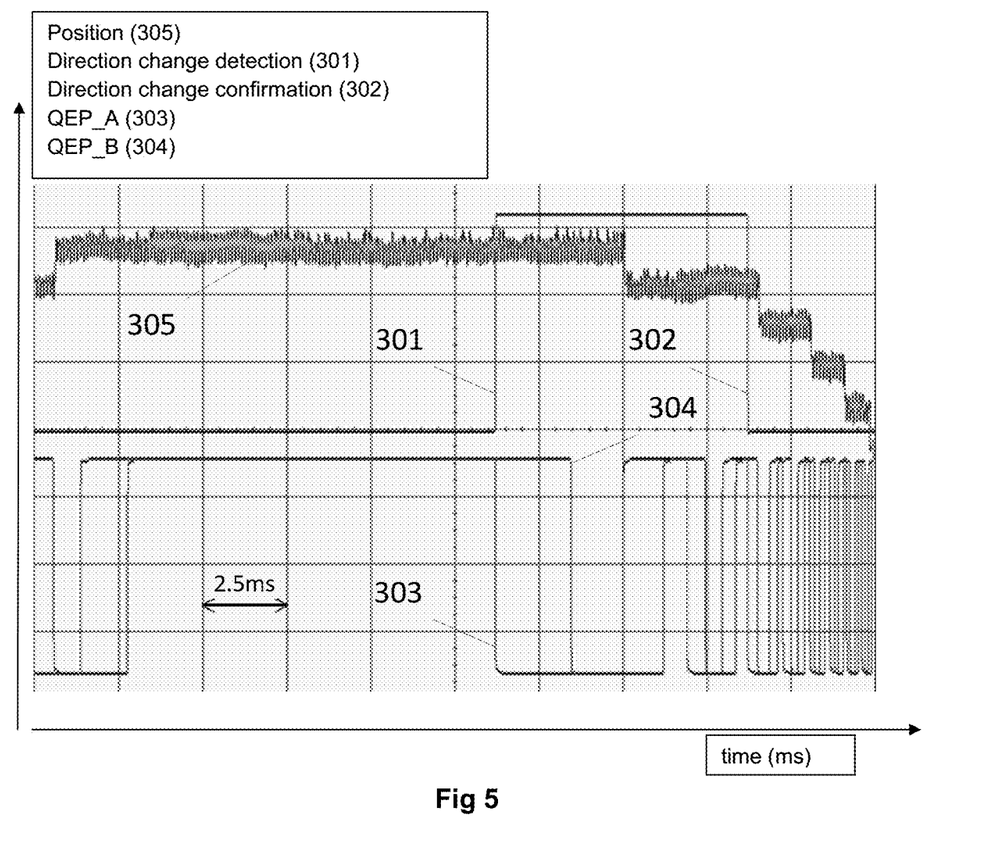
FIG. 5 is a graph illustrating a behavior of position and encoder signals vs time of a motor of the actuation system according to an embodiment of the invention.

The force increase 205 at the end of the mechanical play causes the stepper motor supplied with limited phase currents to lose steps, resulting in a motion direction change, which is observable on the measurement of the motor position, for instance as illustrated in FIG. 5 in which
- reference 305 represents the position estimation based on the QEP signals.
- reference 301 represents the direction change detected
- reference 302 represents the direction change confirmed
- references 303 and 304 represent the QEP signals.

The loss of steps (slipping of the rotor) may be detected in various manners within the scope of the invention to determine the position of the end of mechanical play. In an advantageous embodiment, the direction change due to the loss of steps may be detected by quadrature encoder pulse (QEP) signals 303 and 304 (see FIG. 5) generated by a rotary encoder of the actuator that correspond to a change in direction of motion.

Figure 6A:
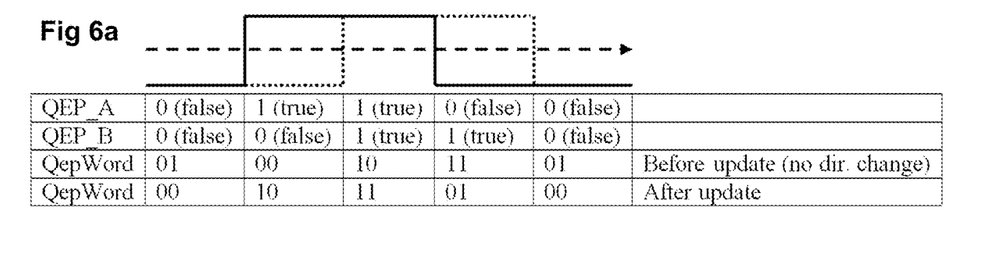
FIG. 6a is a table defining the value of the vavariable QepWord mentioned in FIG. 6b, whereby QepWord represents the state of quadrature encoder pulse (QEP) signals (from a rotor position sensor) during a previous computation period. This information, together with the current state of both QEP signals, enables to compute the movement direction and thus to detect any direction change.
Figure 6B:
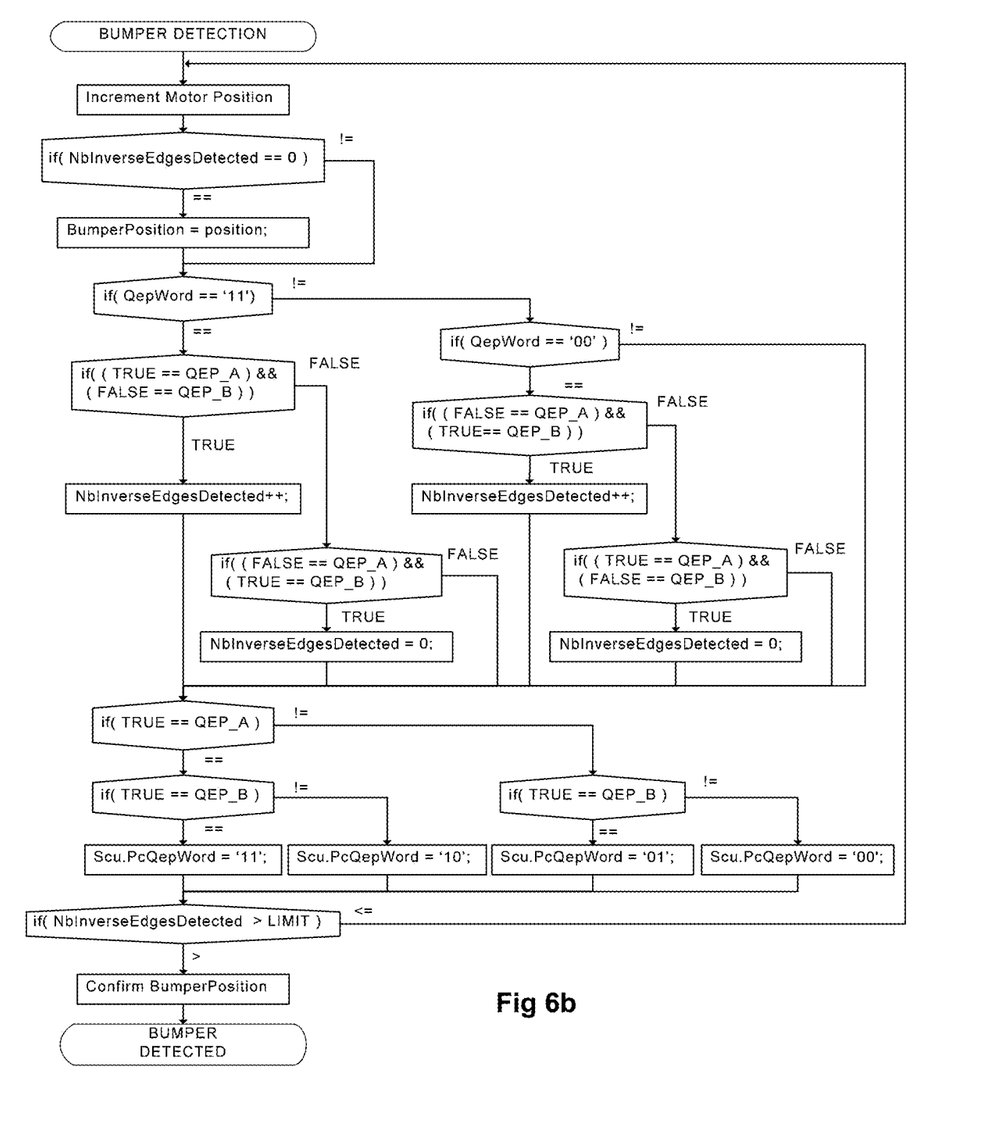
FIG. 6b is a flow diagram of an algorithm of a bumper (end of play) position detection process according to an embodiment of the invention.

On the basis of the QEP signals the position of the end of mechanical play may be determined by a direction change interrupt service routine integrated in the microcontroller triggered by said QEP signals. Alternatively, the end of mechanical play detection may also be performed by high level software instead of the above described interrupt service routine based detection. FIG. 6 illustrates an example of the steps performed by an algorithm for the end of mechanical play detection that may be implemented in an embodiment of the invention.

In FIGS. 6a and 6b, QepWord represents the state of both QEP signals during the previous computation period. This information, together with the current state of both QEP signals, enables to compute the movement direction and thus to detect any direction change.

As long as the stepper motor runs in open loop successfully without losing steps, it does not change its direction of rotation for more than a step. Oscillations within a step must be considered. However, as soon as the stepper motor loses steps due to the stall torque present at the end of the mechanical play, the lost step(s) represents a reverse motion that triggers a direction change interrupt 301. After a parameterized number of increments are counted in the new direction, the end of mechanical play detection may be confirmed 302. Within the direction change interrupt, the position of the mechanical stop is recorded and may be used for mechanical play compensation later on after the sensor is aligned with respect to the stator. Offset values may be saved in a memory of the actuator, for instance an EEPROM of the actuator, in order to correct an eventual offset due to varying spring stiffness over different product categories.

According to another aspect of the invention, the actuator is configured to initialize a position sensor of the actuator.

The actuated system, for example a hydraulic valve, may be controlled by the stepper motor driven in a closed loop regulation. The mechanical position of the rotor of the stepper motor may be detected with an encoder, for instance a magnetic or optical encoder comprising an encoder disk mounted on the rotor, or coupled to the rotor. According to the invention, the mechanical position of the rotor is initialized by determining a mechanical position of the rotor relative to an electrical period of the stepper motor, and then aligning the electrical period with the mechanical position. A misalignment between the mechanical position and electrical period will induce a loss of torque compared to the torque achieved when the electrical period is aligned with the mechanical position. The initialization should preferably be achieved with a minimal rotation of the rotor in order to avoid opening the actuated system 8, for instance a hydraulic valve, during the initialization phase.

According to an embodiment of the invention, the initialization method comprises
- accelerating the motor
- cancelling the current in at least one phase
- measuring the back EMF in said at least one phase without current, and
- determining the position of the rotor when the back EMF measurement becomes null,
- aligning the mechanical position of the rotor with the electrical period of said at least one phase at said position when the back EMF is null.

A commonly employed initialization method in conventional systems consists in applying a constant current in an electrical phase until stabilization of the rotor is achieved. The encoder counter is initialized to '0' at this point. The main drawback of this conventional method is the lack of accuracy under load because the phase difference between the mechanical and electrical periods depends on the load applied during the initialization.

An important advantage of the initialization method according to embodiments of the invention is to remain accurate and reliable under various load conditions.

Referring to FIGS. 7-9c, an initialization method according to an embodiment of the invention is described hereafter.

Figure 7:
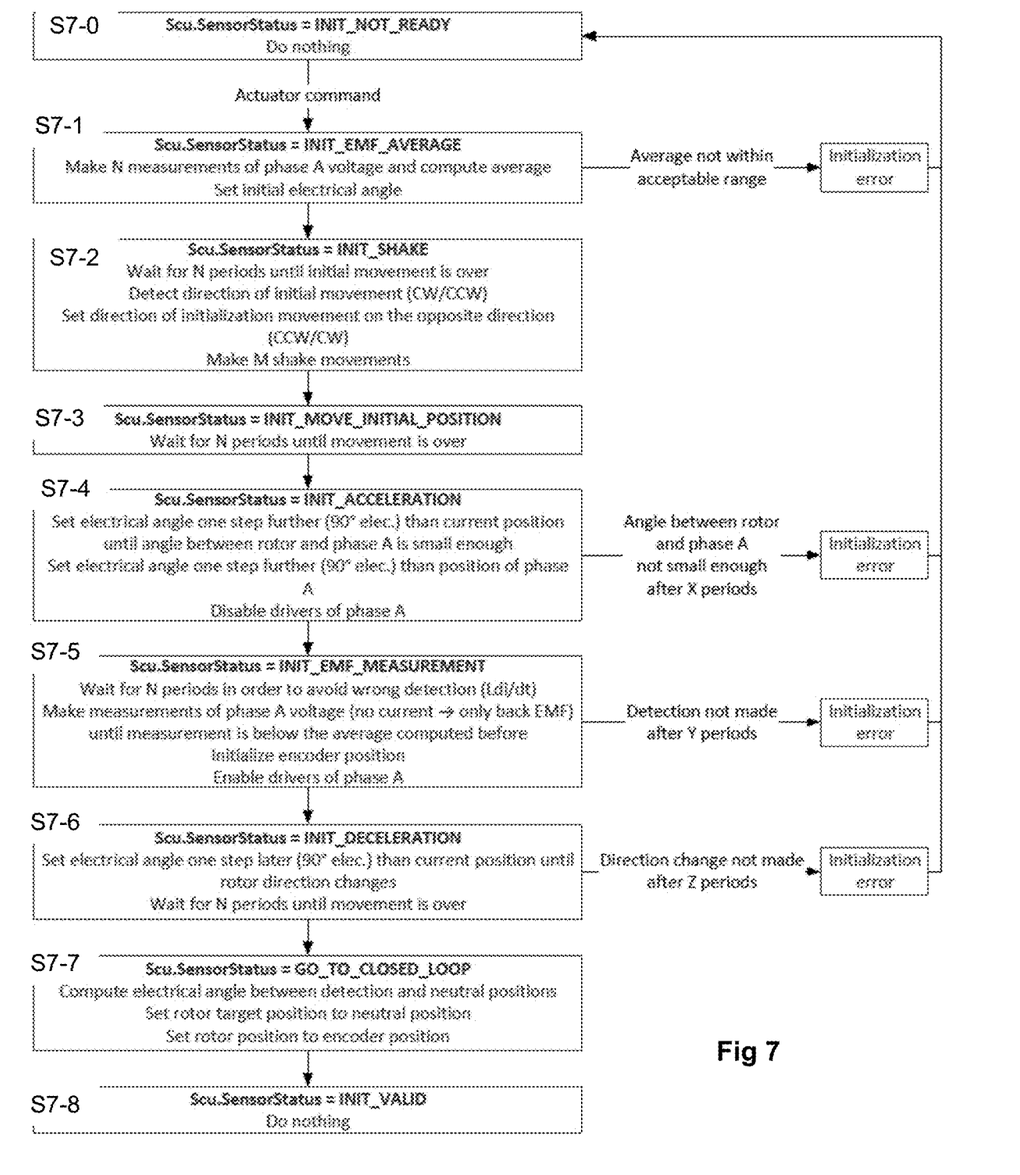
FIG. 7 is a flow diagram of a sensor position initialization process according to an embodiment of the invention.

By way of example we shall consider a two phase stepper motor, however stepper motors with one, three, or more phases may also employ the invention method. The method comprises, in an initial step before the position sensor is initialized S7-0, accelerating the rotor of the motor, for instance with automatic commutation. Then, the current in at least one of the phases (e.g. phase A illustrated in the figures) is switched off in fast decay mode in order to enable the measurement of the back EMF. When the EMF is measured as null, the phase difference between the mechanical and electrical periods is hypothetically null and a counter of the encoder is initialized to '0'. The precision of the initialization depends on the ability to measure accurately the point where the back EMF becomes null, but advantageously the load does not significantly affect the point when the back EMF becomes null and therefore does not affect the measurement of the intitialization position that allows to align the rotor mechanical position with the electrical period.

Figure 8A:
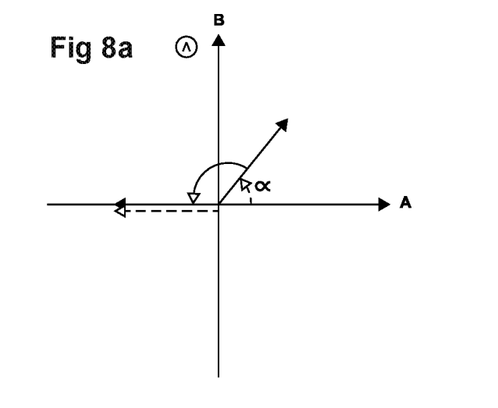
FIGS. 8a to 8e are schemas to illustrate electrical and mechanical position angles of a stepper motor during a sensor position initialization process according to an embodiment of the invention.
Figure 8B:
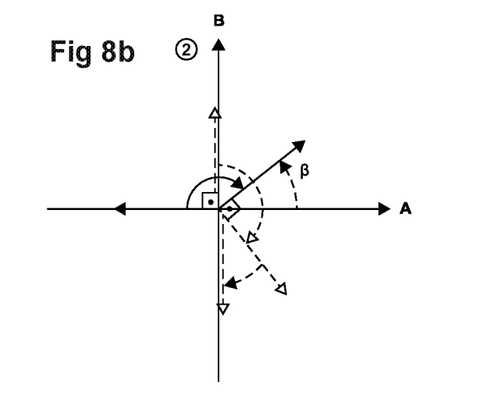
Figure 8C:
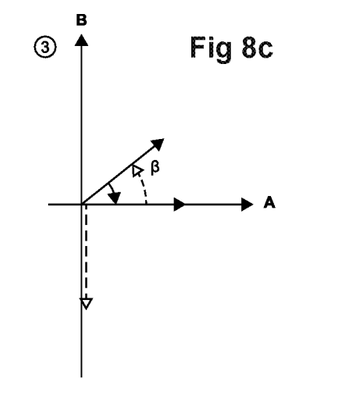
Figure 8D:
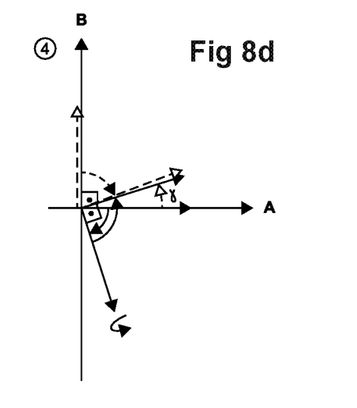

An example of an algorithm for initialization of the position sensor is illustrated in the flow chart of FIG. 7. FIGS. 8a-8e illustrate the electrical period and rotor mechanical position angles during the initialization method. FIGS. 9a and 9b illustrate the behaviour of the phase current and EMF on a plot of current respectively voltage amplitude (y-axis) versus time (x-axis).

In an initial step, the computation of the average of the phase voltage on one of the phases (phase A) is performed by computing an average of a plurality of measurements of the phase voltage (step S7-1). This allows to determine the null value (value 0) of the back EMF voltage. An initial electrical angle value is also set within this step. The computation of the initial electrical angle may be separate from the computation of the average of N measurements of the phase voltage. After setting an initial electrical angle, an initial oscillation movement (shake movement) S7-2, S7-3 of the rotor may be performed with the hypothesis that the rotor is aligned with the electrical angle after the shake movement. The higher the torque applied on the rotor, the higher the misalignment between the computed and actual rotor positions.

During an acceleration phase S7-4, the electrical angle is set one step further, (which corresponds to a 90° electrical phase shift) than the computed rotor mechanical position in order to produce maximum torque. Any misalignment between the mechanical position and electrical period induces a torque loss which reduces the acceleration.

The acceleration phase lasts until the computed rotor mechanical position reaches a predefined threshold angle β. The detection based on the back EMF measurement fails if the rotor goes further than the detection position which corresponds to the angle where the rotor is aligned with the measured phase (phase A). A high misalignment and a low angle β increase the failure rate.

At the end of the acceleration phase S7-4 the phase current is switched off and the phase voltage is measured after a predetermined waiting time (step S7-5) to ensure that the negative voltage peak due to the rapid change in current di/dt does not produce a false measurement. When the phase voltage corresponds to the average of the phase voltage computed in step S7-1 (in the example illustrated, when the phase voltage drops to the average value) then the position of the rotor is determined and the encoder position is initialized.

After initialization of the encoder position, the rotor may be decelerated (step S7-6) to keep the initialization procedure as short as possible. The deceleration may be performed by setting the electrical angle one step later than the aligned position until the rotor direction changes.

After a short delay until the rotor stops moving, the electrical angle between the current position (rotor position after the initialization process) and the initial rotor position (rotor position before the initialization process) is computed and the rotor target position (the position that the rotor should reach) is set to the initial rotor position and then the rotor position is set to the initialized encoder position (step S7-7). The goal of step S7-7 is to move the rotor back to the neutral position which corresponds to the middle of the dead zone. The initialization of the position sensor and the alignment of the electrical period with the rotor mechanical position is now completed (S7-8).

FIGS. 8a to 8d are schemas illustrating the rotor and electrical period position vectors to help explain the evolution of the electrical and rotor angles in the above described initialization process, where:

the angle α represents the initial rotor position.

The angle β represents the rotor position at the end of the acceleration phase.

The angle γ represents the final rotor position.

| | Initialization phase | Explanations about electrical angle and rotor angle |
|---|---|---|
| FIG. 8a | INIT_NOT_READY → INIT_MOVE_INITIAL_POSITION | Set initial electrical angle (shake movement is not shown below) |
| FIG. 8b | INIT_ACCELERATION | Set electrical angle one step further (90° elec.) than current position . . . . . . until angle between rotor and phase A is small enough Set electrical angle one step further (90° elec.) than position of phase A |
| FIG. 8c | INIT_EMF_MEASUREMENT | |

| | Initialization phase | Explanations about electrical angle and rotor angle |
|---|---|---|
| FIG. 8d | INIT_DECELERATION → INIT_GO_TO_CLOSED_LOOP | Set electrical angle one step later (90° elec.) than current position . . . . . . until rotor direction changes |

Figure 8E:
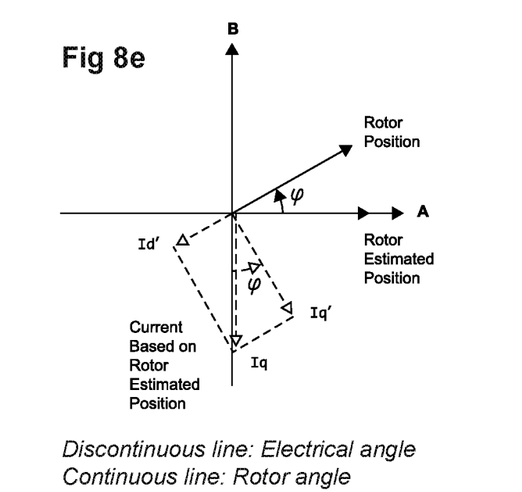
Figure 9A:
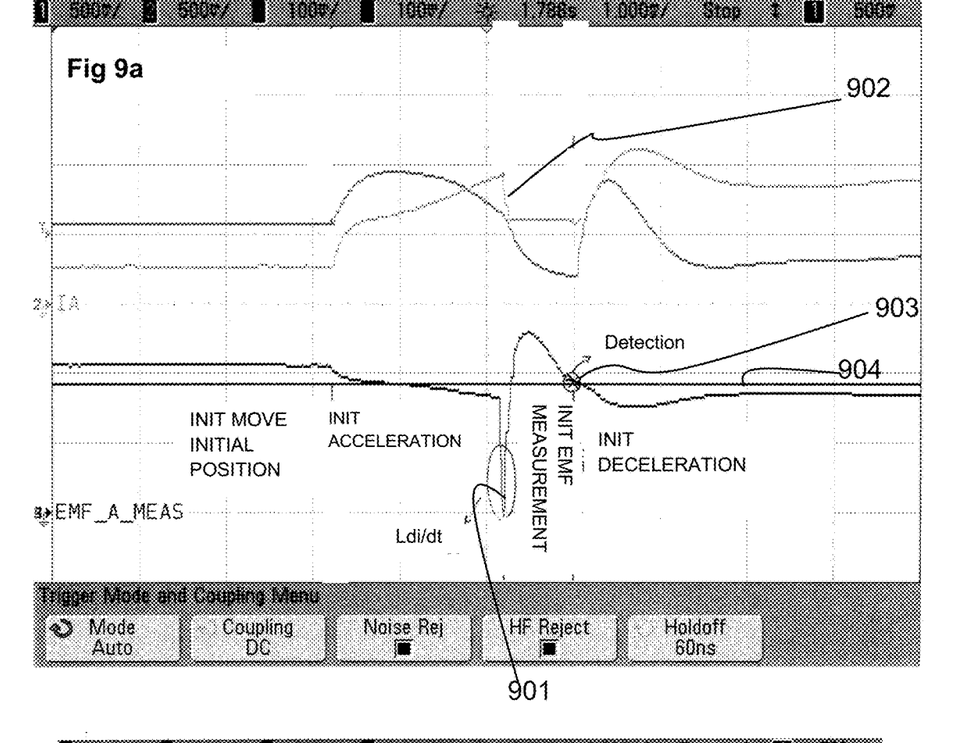
FIG. 9a is a graph of currents in both phases and back EMF voltage in one of the phases of a two phase stepper motor during a sensor position initialization process according to an embodiment of the invention.
Figure 9B:
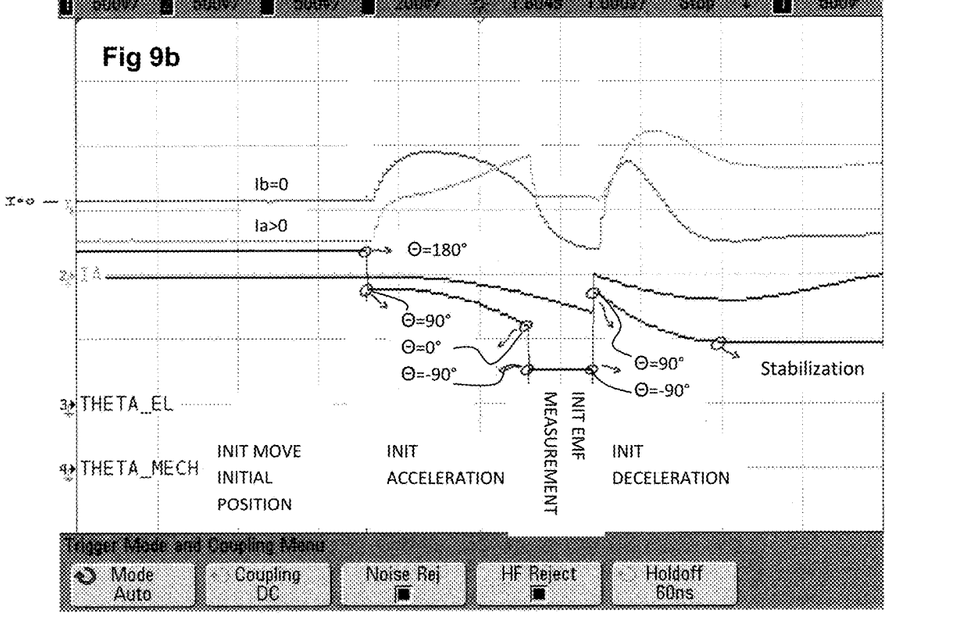
FIG. 9b is a graph of current and electrical and mechanical angles in phases of a stepper motor during a sensor position initialization process according to an embodiment of the invention.

FIG. 8e is a schema illustrating the rotor and electrical period position vectors to help explain the minimization of torque loss. An objective of the encoder initialization is to minimize the phase difference φ between the rotor position and the rotor estimated position. Any phase difference induces a torque loss since the phase currents $I_q$ are based on the rotor estimated position. The phase currents vector components $I'_q$, $I'_d$ may be used to calculated the theoretical loss in torque due to the phase difference φ between the rotor position and the rotor estimated position.

$$I'_q = I_q \cos\varphi \Rightarrow \varphi = \cos^{-1}\frac{I'_q}{I_q}$$

$$I'_d = -I_q \sin\varphi$$

The table below shows some values of torque M compared to the nominal (maximum) torque $M_n$ as a function of the phase difference.

| Phase difference | Torque |
|---|---|
| φ = 00° | M = cos(00) × Mn = 1.00 × Mn |
| φ = 10° | M = cos(10) × Mn = 0.98 × Mn |
| φ = 20° | M = cos(20) × Mn = 0.94 × Mn |
| φ = 30° | M = cos(30) × Mn = 0.87 × Mn |
| φ = 40° | M = cos(40) × Mn = 0.77 × Mn |

FIG. 9a shows the evolution of the phase currents and the back EMF voltage measurement during the different phases until deceleration for a two phase stepper motor, where I_A is the current in phase A,
I_B is the current in phase B,
EMF_A_MEAS is the measurement of phase A back EMF voltage,
EMF_A_MEAN is the average value of phase A back EMF voltage.

The negative peak 901 of the measured back EMF between the acceleration and measurement steps is produced by the fast decay 902 of the current in phase A. The fast current variation produces a voltage peak according to U=Ldi/dt which may be ignored. The initialization point 903 is the next crossing between the back EMF measurement and the null value 904 which corresponds to the computed average initial EMF voltage. This point 903 can be easily detected with the high to low transition of the back EMF measurement via a comparator.

FIG. 9b shows the evolution of the phase currents and the electrical angle during the different phases until deceleration, where I_A is the current in phase A,
I_B is the current in phase B,
THETA_EL is the electrical angle (command)
THETA_MECH is the mechanical angle According to a variant, the stepper motor may be replaced by other types of permanent magnet synchronous (PMS) motors, in particular a BLDC (brushless direct current) motor, that is driven in open loop stepper mode during the method of compensating for play. After the detection of play and compensation therefor, the BLDC motor may then be driven in closed loop mode. Closed loop mode of driving a motor PMS BLDC motor in normal operation is per se well known. In the case of a BLDC, instead of using the interruption of a QEP module as described above, a detection of the loss of steps and the first and second ends of play may be performed by a software detection of the direction change, based on the signals of a rotor position detector. The rotor position detector may be an encoder as previously described, or may in the form of Hall effect sensors, for instance 3 Hall sensors, integrated in the motor for control of the rotor speed and position. Integration of such Hall sensors in a BLDC motor is per se well known and does not need to be further described herein.

The invention claimed is:

1. A method of compensating for play in an actuation system including an actuated system comprising an elastic element, and an actuator with a stepper motor having at least one electrical phase, the method comprising:
supplying by means of a current controller said at least one electrical phase with a first limited phase current configured to drive the rotor of the stepper motor in a first direction, said limited phase current having an amplitude inferior to an operational phase current needed to drive the rotor in normal load operation for actuation of the actuated system in said first direction,
detecting a loss of steps of the stepper motor in said first direction and determining therefrom a first end of mechanical play position,
driving with a second limited phase current the rotor of the stepper motor in a second direction opposite to the first direction, said second limited phase current having an amplitude inferior to an operational phase current needed to drive the rotor in normal load operation for actuation of the actuated system in the second direction,
detecting a loss of steps of the stepper motor in said second direction and determining therefrom a second end of mechanical play position, and
compensating, by the actuator, for mechanical play in the actuation system based on the first and second ends of mechanical play positions.

2. The method according to claim 1, wherein said detecting a loss of steps is performed by means of a rotor position sensor or by means of a software stall detection algorithm based on current and voltage measurement of an electrical phase of the motor.

3. The method of claim 1, wherein the first and second limited phase currents have amplitudes inferior to the phase currents required to generate sufficient torque to overcome a spring force of the elastic element of the actuated system necessary to control the actuated system.

4. The method of claim 1, wherein the current controller drives the electrical phase in open loop regulation.

5. The method of claim 2, wherein the loss of steps is detected by sensing a motion direction change on the rotor displacement.

6. The method of claim 3, wherein the actuated system is a hydraulic valve system comprising one or more valve spools, and the torque on the rotor produced by the first and second limited phase currents either:
- does not move a valve spool by not exceeding a spring preload force of the elastic element biasing the valve spool, or
- does not move the valve spool sufficiently to change a valve setting by not exceeding a spring force of the elastic element necessary to move the valve spool enough to the change the valve setting.

7. A method of compensating for play in an actuation system including an actuated system comprising an elastic element, and an actuator with a stepper motor having at least one electrical phase, the method comprising:
- supplying by means of a current controller said at least one electrical phase with a first limited phase current configured to drive the rotor of the stepper motor in a first direction, said limited phase current having an amplitude inferior to an operational phase current needed to drive the rotor in normal load operation for actuation of the actuated system in said first direction,
- detecting a loss of steps of the stepper motor in said first direction and determining therefrom a first end of mechanical play position,
- driving with a second limited phase current the rotor of the stepper motor in a second direction opposite to the first direction, said second limited phase current having an amplitude inferior to an operational phase current needed to drive the rotor in normal load operation for actuation of the actuated system in the second direction,
- detecting a loss of steps of the stepper motor in said second direction and determining therefrom a second end of mechanical play position, and
- compensating the actuator for mechanical play in the actuation system based on the first and second ends of mechanical play positions, wherein said detecting a loss of steps is performed by means of a rotor position sensor or by means of a software stall detection algorithm based on current and voltage measurement of an electrical phase of the motor, wherein the loss of steps is detected by sensing a motion direction change on the rotor displacement, and wherein the rotor position sensor comprises a rotary encoder and the motion direction change is detected by quadrature encoder pulse (QEP) signals generated by the rotary encoder.

8. The method of claim 7, wherein on the basis of the QEP signals a direction change interrupt service routine is triggered.

9. A method of initializing a position sensor of an actuation system including an actuated system and an actuator with a stepper motor having at least one electrical phase, the method comprising:
- supplying a current to said at least one electrical phase configured to accelerate a rotor of the motor during an acceleration phase,
- switching off the supply current in said at least one electrical phase,
- measuring a back EMF voltage in said at least one electrical phase with the supply current switched off and determining, with the position sensor, a mechanical position of the rotor when the back EMF voltage measurement reaches a pre-defined value, and
- aligning the mechanical position of the rotor with an electrical angle of said at least one electrical phase at said position when the back EMF voltage reaches said pre-defined value.

10. The method of claim 9, wherein said pre-defined value is null.

11. The method of claim 9, wherein an average of the phase voltage on at least one of the phases (phase A) is performed by computing an average of a plurality of measurements of the phase voltage, said average value allowing to determine said pre-defined value of the back EMF voltage.

12. The method of claim 9, wherein after setting an initial electrical angle, an initial oscillation movement of the rotor is performed.

13. The method of claim 9, wherein the phase current is switched off at the end of the acceleration phase and the phase voltage is measured after a predetermined waiting time to ensure that a negative voltage peak due to a rapid change in current (di/dt) does not produce a false measurement.

14. The method of claim 9, wherein when the phase voltage corresponds to the computed average of the phase voltage then the position of the rotor is determined and the encoder position is initialized.

15. The method of claim 9, wherein after initialization of the encoder position, the rotor is decelerated to keep the initialization procedure as short as possible.

16. A method of initializing a position sensor of an actuation system including an actuated system and an actuator with a stepper motor having at least one electrical phase, the method comprising:
- supplying a current to said at least one electrical phase configured to accelerate a rotor of the motor during an acceleration phase,
- switching off the supply current in said at least one electrical phase,
- measuring a back EMF voltage in said at least one electrical phase with the supply current switched off and determining with the position sensor a mechanical position of the rotor when the back EMF voltage measurement reaches a pre-defined value, and
- aligning the mechanical position of the rotor with an electrical angle of said at least one electrical phase at said position when the back EMF voltage reaches said pre-defined value, wherein during said acceleration phase of the rotor, the electrical angle is set one step further than the computed rotor mechanical position in order to produce maximum torque.

17. The method of claim 16, wherein the acceleration phase lasts until the computed rotor mechanical position reaches a predefined threshold angle ($\beta$).

18. An actuator comprising a stepper motor having at least one electrical phase, a controller, a rotor position sensor, and a motion transmission system configured to be coupled to an actuated system,
- wherein the controller is configured to supply said at least one electrical phase with a first limited phase current configured to drive the rotor of the stepper motor in a first direction, said limited phase current having an amplitude inferior to an operational phase current needed to drive the rotor in normal load operation for actuation of the actuated system in said first direction, and the rotor position sensor is configured to detect a loss of steps of the stepper motor in said first direction and the controller is configured to determine therefrom a first end of mechanical play position, and wherein the current controller is configured to supply said at least one electrical phase with a second limited phase current to drive the rotor of the stepper motor in a second direction opposite to the first direction, said second limited phase current having an amplitude inferior to an operational phase current needed to drive the rotor in normal load operation for actuation of the actuated system in the second direction, said rotor position sensor configured to detect a loss of steps of the stepper motor in said second direction and the controller is configured to determine therefrom a second end of mechanical play position, the actuator configured to compensate for mechanical play in the actuated system based on the first and second ends of mechanical play positions.

19. An actuator comprising a stepper motor having at least one electrical phase, a controller, a rotor position sensor, a back EMF voltage sensor, a current sensor, and a motion transmission system configured to be coupled to an actuated system, wherein the controller is configured to supply a current to said at least one electrical phase to accelerate a rotor of the stepper motor during an acceleration phase and subsequently switch off the supply current in said at least one electrical phase, the back EMF voltage sensor is configured to measure a back EMF voltage in said at least one electrical phase with the supply current switched off and the rotor position sensor is configured to determine therefrom a mechanical position of the rotor when the back EMF voltage measurement reaches a pre-defined value, and the controller is configured to control the stepper motor to align the mechanical position of the rotor with the electrical angle of said at least one electrical phase at said position when the back EMF voltage reaches the pre-defined value.

20. The method of claim 19, wherein said detecting a loss of steps is performed by means of a rotor position sensor or by means of a software stall detection algorithm based on current and voltage measurement of an electrical phase of the motor.

21. The method of claim 19, wherein the first and second limited phase currents have amplitudes inferior to the phase currents required to generate sufficient torque to overcome a spring force of the elastic element of the actuated system necessary to control the actuated system.

22. A method of compensating for play in an actuation system including an actuated system comprising an elastic element, and an actuator with a permanent magnet synchronous (PMS) brushless direct current (BLDC) motor having at least one electrical phase, the method comprising:

supplying by means of a current controller said at least one electrical phase with a first limited phase current configured to drive in open loop stepper mode the rotor of the BLDC motor in a first direction, said limited phase current having an amplitude inferior to an operational phase current needed to drive the rotor in normal load operation for actuation of the actuated system in said first direction, detecting a loss of steps of the BLDC motor in said first direction and determining therefrom a first end of mechanical play position, driving in open loop stepper mode with a second limited phase current the rotor of the stepper motor in a second direction opposite to the first direction, said second limited phase current having an amplitude inferior to an operational phase current needed to drive the rotor in normal load operation for actuation of the actuated system in the second direction, detecting a loss of steps of the BLDC motor in said second direction and determining therefrom a second end of mechanical play position, and compensating, by the actuator, for mechanical play in the actuation system based on the first and second ends of mechanical play positions.

23. The method of claim 22, wherein the loss of steps is detected by sensing a motion direction change on the rotor displacement.

24. The method of claim 23, wherein the actuated system is a hydraulic valve system comprising one or more valve spools, and the torque on the rotor produced by the first and second limited phase currents either:

does not move a valve spool by not exceeding a spring preload force of the elastic element biasing the valve spool, or does not move the valve spool sufficiently to change a valve setting by not exceeding a spring force of the elastic element necessary to move the valve spool enough to the change the valve setting.

25. The actuator of claim 24, wherein the rotor position sensor comprises Hall Effect sensors for instance, three Hall Effect sensors, integrated in the motor.

26. An actuator comprising a PMS BLDC motor having at least one electrical phase, a controller, a rotor position sensor, and a motion transmission system configured to be coupled to an actuated system, wherein the controller is configured to supply said at least one electrical phase with a first limited phase current configured to drive in open loop stepper mode the rotor of the motor in a first direction, said limited phase current having an amplitude inferior to an operational phase current needed to drive the rotor in a normal load operation for actuation of the actuated system in said first direction, and the rotor position sensor is configured to detect a loss of steps of the stepper motor in said first direction and the controller is configured to determine therefrom a first end of mechanical play position, and wherein the current controller is configured to supply said at least one electrical phase with a second limited phase current to drive in open loop stepper mode the rotor of the motor in a second direction opposite to the first direction, said second limited phase current having an amplitude inferior to an operational phase current needed to drive the rotor in normal load operation for actuation of the actuated system in the second direction, said rotor position sensor configured to detect a loss of steps of the motor in said second direction and the controller is configured to determine therefrom a second end of mechanical play position, the actuator configured to compensate for mechanical play in the actuation system based on the first and second ends of mechanical play positions.

* * * * *

UNITED STATES PATENT AND TRADEMARK OFFICE
CERTIFICATE OF CORRECTION

PATENT NO. : 10,673,361 B2
APPLICATION NO. : 15/746890
DATED : June 2, 2020
INVENTOR(S) : Martin Liniger, Markus Fluckiger and Jan Persson Page 1 of 1

It is certified that error appears in the above-identified patent and that said Letters Patent is hereby corrected as shown below:

In the Claims

Column 16, Line 12, "claim 22" should read --claim 20--.
Column 16, Line 15, "claim 24" should read --claim 21--.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*